(12) United States Patent
Fukuda (10) Patent No.: US 11,196,881 B2
(45) Date of Patent: Dec. 7, 2021

(54) IMAGE FORMING APPARATUS EMPLOYS A LINE-OF-SIGHT DETECTION TECHNIQUE TO EXECUTE USER OPERATIONS IN PLURAL MODES

(71) Applicant: CANON KABUSHIKI KAISHA, Tokyo (JP)

(72) Inventor: Takeshi Fukuda, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/748,136

(22) Filed: Jan. 21, 2020

(65) Prior Publication Data
US 2020/0236233 A1   Jul. 23, 2020

(30) Foreign Application Priority Data

Jan. 21, 2019   (JP) .............................. JP2019-007929
Jan. 21, 2019   (JP) .............................. JP2019-007930
Jan. 21, 2019   (JP) .............................. JP2019-007931
Jan. 21, 2019   (JP) .............................. JP2019-007932

(51) Int. Cl.
*H04N 1/00* (2006.01)
*G06F 3/01* (2006.01)
*G06F 1/3231* (2019.01)

(52) U.S. Cl.
CPC ......... *H04N 1/00411* (2013.01); *G06F 3/013* (2013.01); *H04N 1/00408* (2013.01); *G06F 1/3231* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2014/0062862 A1* | 3/2014 | Yamashita | G06F 3/012 345/156 |
| 2015/0030214 A1* | 1/2015 | Fujiwara | G06K 9/00288 382/118 |
| 2016/0269578 A1* | 9/2016 | Nozawa | G06T 11/60 |
| 2017/0272585 A1* | 9/2017 | Nakahara | H04N 1/00538 |
| 2017/0279995 A1* | 9/2017 | Yamasaki | G06F 3/1238 |
| 2018/0091667 A1 | 3/2018 | Yamasaki et al. | |
| 2018/0103158 A1* | 4/2018 | Miyake | H04N 1/00559 |
| 2018/0295245 A1* | 10/2018 | Kawaguchi | H04N 1/00419 |
| 2019/0003899 A1 | 1/2019 | Inagawa | |
| 2019/0089857 A1* | 3/2019 | Nishida | H04N 1/00928 |

FOREIGN PATENT DOCUMENTS

JP   2018049528 A   3/2018

* cited by examiner

*Primary Examiner* — Haris Sabah
(74) *Attorney, Agent, or Firm* — Venable LLP (57) ABSTRACT

An image forming apparatus capable of forming an image on a recording material includes a display portion capable of displaying a software key permitting input by a user's line of sight; an image pickup portion configured to pick up an image of a user's face; and a controller capable of executing a setting mode in which setting such that the user's line of sight is in a detectable state is made on the basis of output of the image pickup portion and an input mode in which input corresponding to the software key is received in accordance with a line-of-sight input operation to the software key by the user's line of sight detected on the basis of the setting of the setting mode. The controller notifies a user of an event that an operation mode is changed from the setting mode to the input mode.

20 Claims, 8 Drawing Sheets

IMAGE FORMING APPARATUS EMPLOYS A LINE-OF-SIGHT DETECTION TECHNIQUE TO EXECUTE USER OPERATIONS IN PLURAL MODES

FIELD OF THE INVENTION AND RELATED ART

The present invention relates to an image forming apparatus, such as a printer, a copying machine, a facsimile machine or a multi-function machine, employing a line-of-sight detection technique.

In recent years, in order to improve convenience of an operator (user), an image forming apparatus employing the line-of-sight detection technique for detecting a line of sight of the operator has been proposed (Japanese Laid-Open Patent Application 2018-49528). In a conventional apparatus, depending on detection of the operator's line of sight directed to a display apparatus, control for changing a display screen displayed on the display apparatus has been carried out (so-called line-of-sight input).

However, conventionally, although the line-of-sight detection technique was employed, operability as the image forming apparatus was poor. Therefore, although a constitution in which the line-of-sight detection technique was employed in the image forming apparatus and which is ease of operation for the operator, i.e., which is higher in convenience of the user was desired, such a constitution has not yet been proposed.

SUMMARY OF THE INVENTION

The present invention has been accomplished in view of the above-described problem. A principal object of the present invention is to provide an image forming apparatus which employs a line-of-sight detection technique and which is improved in convenience of a user.

According to an aspect of the present invention, there is provided an image forming apparatus capable of forming an image on a recording material, comprising: a display portion capable of displaying a software key permitting input by a user's line of sight; an image pickup portion configured to pick up an image of a user's face; and a controller capable of executing an operation in a setting mode in which setting such that the user's line of sight is in a detectable state is made on the basis of output of the image pickup portion and an operation in an input mode in which input corresponding to the software key is received in accordance with a line-of-sight input operation to the software key by the user's line of sight detected on the basis of the setting of the setting mode, wherein the controller notifies a user of an event that an operation mode is changed from the setting mode to the input mode.

According to another aspect of the present invention, there is provided an image forming apparatus capable of forming an image on a recording material, comprising: a display portion capable of displaying information on the image forming apparatus; an image pickup portion configured to pick up an image of a user's face; and a controller configured to detect a user's line of sight on the basis of output of the image pickup portion, wherein the controller causes the display portion to display a mark movable in interrelation with movement of the detected user's line of sight.

According to another aspect of the present invention, there is provided an image forming apparatus capable of forming an image on a recording material, comprising: a display portion capable of displaying a plurality of software keys permitting input by a user's line of sight; an image pickup portion configured to pick up an image of the user's line of sight; and a controller configured to detect the user's line of sight on the basis of the image pickup portion and configured to receive line-of-sight input to the software keys by the detected user's line of sight, wherein the controller notifies a user of an event that the user's line of sight is directed by any of the software keys.

According to a further aspect of the present invention, there is provided an image forming apparatus capable of forming an image on a recording material, comprising: an operation unit including a display portion capable of displaying a software key permitting input by a user's line of sight; an image pickup portion configured to pick up an image of the user's line of sight; a target portion provided at two or more positions of the operation unit; and a controller configured to detect the user's line of sight on the basis of output of the image pickup portion and configured to receive line-of-sight input to the software key by the user's line of sight, wherein on the basis of an image pick up result of the image pickup portion acquired when the user's line of sight is positioned at the target portion, the controller is capable of executing an operation in an information acquiring mode in which information on the user's line of sight to which reference is made when the user's line of sight is detected is acquired.

Further features of the present invention will become apparent from the following description of exemplary embodiments with reference to the attached drawings.

DESCRIPTION OF EMBODIMENTS

<Image Forming Apparatus>

Figure 1:
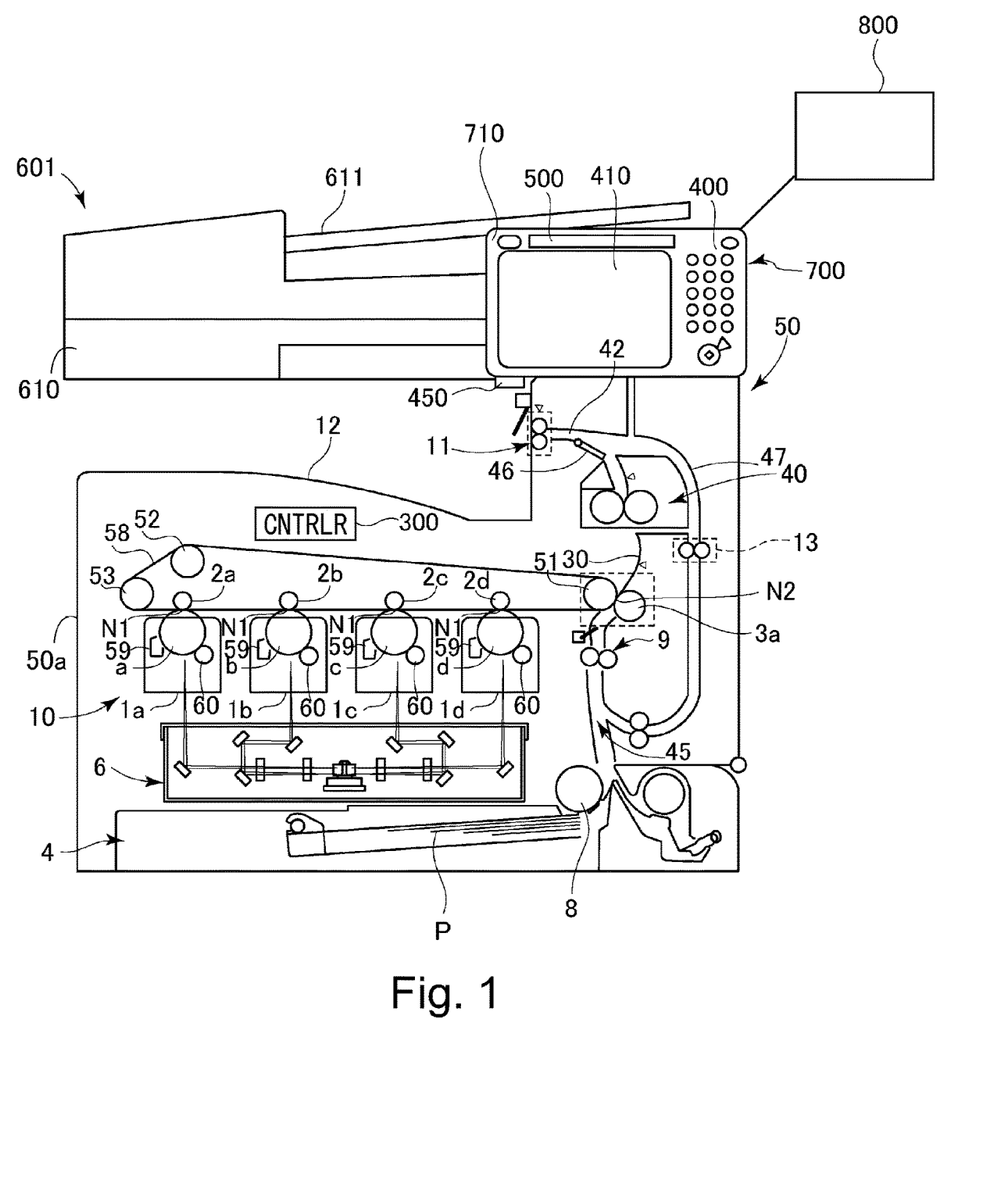
FIG. 1 is a schematic view showing an image forming apparatus according to an embodiment of the present invention.

First, an image forming apparatus of an embodiment of the present invention will be described. An image forming apparatus 50 shown in FIG. 1 is a tandem full-color printer of an electrophotographic type. The image forming apparatus 50 forms a toner image on a recording material (a sheet material such as a sheet or an OHP sheet) (on the basis of image data sent from an original reading device 601 connected to an apparatus main assembly 50a or from an external terminal (not shown) such as a computer connected to the apparatus main assembly 50a.

The original reading device 601 includes an original carriage on which an original is mountable, and includes a reading device 610 capable of reading the original mounted (placed) on the original carriage and an original feeding device 611 (automatic document feeder) for feeding the original to the reading device 610. The reading device 610 is principally provided with a first reading portion, an original supporting platen glass and a skimming through glass which are not shown. The original feeding device 611 is openable relative to the original supporting platen glass of the reading device 610. The original placed on the original supporting platen glass is pressed by a pressing plate portion provided on the original feeding device 611 so as to oppose the original supporting platen glass, and an image is read by the first reading portion operating in response to a start of copying or scanning of the image. On the other hand, the original feeding device 611 is principally provided with a second reading portion and an original feeding portion which are not shown. An original mounted (placed) on an unshown tray is sent, to the skimming through glass of the reading device 610, by the original feeding portion operating in response to the start of copying or scanning of the image, and an image of a first side (surface) is read by the first reading portion and then an image of a second side (surface) opposite from the first side is read by the second reading portion. Then, the images read by the first reading portion and the second reading portion are used as image data for forming electrostatic latent images on photosensitive drums a to d by a laser scanner 6 described later.

The image forming apparatus 50 includes an image forming portion 10 capable of forming images of yellow, magenta, cyan and black. The image forming portion 10 includes image forming units 1a, 1b, 1c and 1d arranged along a circumferential direction of an intermediary transfer belt 58. The image forming units 1a, 1b, 1c and 1d include rotatable photosensitive drums a to d, chargers 60, and developing devices 59. The photosensitive drums a to d are electrically charged by the corresponding chargers 60 and thereafter are subjected to scanning exposure to laser light, corresponding to image data, emitted from a laser scanner 6. As a result, electrostatic latent images depending on the image data are formed on surfaces of the photosensitive drums a to d. Then, the electrostatic latent images formed on the photosensitive drums a to d are developed into toner images with developers by the developing devices 59. The respective toner images formed on the photosensitive drums a to d are primary-transferred onto the intermediary transfer belt 58 at primary transfer nips N1 by applying a primer transfer bias to primary transfer rollers 2a to 2d provided opposed to the photosensitive drums a to d, respectively on an inner peripheral surface side of the intermediary transfer belt 58.

The intermediary transfer belt 58 having an endless belt shape is stretched by an inner secondary transfer roller 51 and stretching rollers 52 and 53. At a position opposing the inner secondary transfer roller 51 through the intermediary transfer belt 58, an outer secondary transfer roller 3a is provided and forms a secondary transfer nip N2 for permitting secondary transfer of the toner images from the intermediary transfer belt 58 onto the recording material P.

At a lower portion of the image forming apparatus 50, a sheet feeding cassette 4 on which recording materials P are mounted (stacked) is provided. The recording materials P are supplied one by one from the sheet feeding cassette 4 to a feeding passage 45 by a feeding roller 8. The recording material P supplied from the sheet feeding cassette 4 passes through the feeding passage 45 and is sent to a pair of registration rollers 9. The registration rollers 9 once receive the recording material P and correct oblique movement of the recording material P and then feed the recording material P to the secondary transfer nip N2 in synchronism with timing of toner image formation on the intermediary transfer belt 58 in the respective image forming units 1a to 1d. Then, by applying a secondary transfer bias to the outer secondary transfer roller 3a, the toner images on the intermediary transfer belt 58 are secondary-transferred onto the recording material P at the secondary transfer portion N2. Thereafter, the recording material P is fed toward a fixing device 40 through a pre-fixing passage 30. In the fixing device 40, with nip-feeding of the recording material P by a roller pair forming a fixing nip, the toner images are heated and pressed and thus are fixed on the recording material P.

In the case where the toner image is formed on only one side (surface) of the recording material P, the recording material P passed through the fixing device 40 is discharged onto a discharge tray 12 by a normally rotating discharging roller pair 11. On the other hand, in the case where the toner images are formed on both sides (surfaces) of the recording material P, the recording material P passed through the fixing device 40 is fed by the normally rotating discharging roller pair 11, but when a trailing end of the recording material P reaches a reversing point 42, the recording material P is subjected to switch-back feeding toward a double-side feeding passage 47. That is, when the trailing end of the recording material P, not only a switching flapper 46 is switched but also rotation of the discharging roller pair 11 is changed from normal rotation to reverse rotation, so that the recording material P is sent to the double-side feeding passage 47 without being discharged onto the discharge tray 12. The recording material P sent to the double-side feeding passage 47 is returned to the feeding passage 45 by a feeding roller pair 13 and is subjected to a process similar to the process during toner image formation on the one side, so that the toner image is formed also on the other side. Then, the recording material P on which the toner images are formed on both sides is discharged onto the sheet discharge tray 12 by the normally rotating sheet discharging roller pair 11.

As shown in FIG. 1, the image forming apparatus 50 of this embodiment is provided with a human sensor 450. The human sensor 450 is a sensor of a temperature change detection type using infrared radiation capable of detecting an ambient temperature change of the image forming apparatus 50, for example. That is, in the case where an ambient temperature is changed due to that an operator approaches the image forming apparatus 50 are crosses the infrared radiation emitted by the human sensor 450, or in the like case, the human sensor 450 is capable of detecting a location (position) of the operator. In the case of this embodiment, the human sensor 450 is disposed on an operation panel 700 so that the location of the operator can be detected when the operator is on the front side of the image forming apparatus 50, specifically is in a position opposing the front surface of the operation panel 700. In this embodiment, a detectable range of the human sensor 450 was set within a conical range such that, for example, the human sensor 450 is the top (point) and the detectable range is about 500 mm in width and about 300 mm in radius. Incidentally, the human sensor 450 is not limited to a thermal sensor of the temperature change detection type using the infrared radiation, but sensors of any type may also be used if the sensors are capable of detecting the location of the operator.

<Operation Panel>

Figure 2:
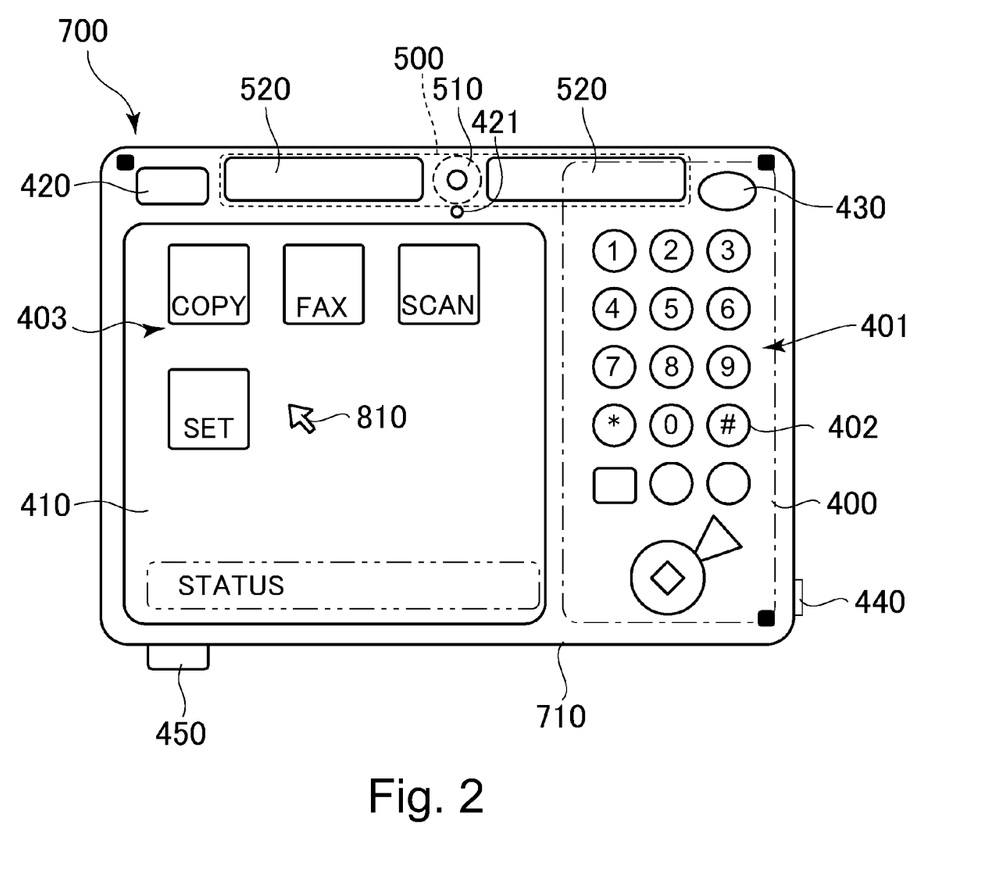
FIG. 2 is a schematic view showing an operation panel.

Further, the image forming apparatus 50 of this embodiment includes the operation panel 700. The operation panel 700 includes operation elements operable by the operator, and is disposed on the front side of the apparatus main assembly 50a so that the operator easily operates the operation panel 700. The operation panel 700 is, for example, provided on the apparatus main assembly so that an angle thereof is adjustable vertically horizontally. For that reason, the operator is capable of adjusting an orientation of the operation panel 700 so that a face himself (herself) opposes the front surfaces of the operation panel 700. In FIG. 2, an example of the operation panel 700 as an operating portion is shown. As shown in FIG. 2, the operation panel 700 includes a hardware portion 400 provided with hardware keys 401 which are physically provided and includes a display portion 410 capable of displaying various pieces of information and software keys 403 described later, and a panel cover 710 covering an unshown substrate or the like provided inside the operation panel 700. The panel cover 710 is provided so as to expose the hardware portion 400 and the display portion 410 at a surface thereof. In the case of this embodiment, as described later, the hardware portion 400 and the display portion 410 of the operation panel 700 function as a user interface permitting input operation by a user's line of sight.

<Hardware Portion>

The hardware portion 400 is provided with hardware keys 401, which are physical operation elements to which various functions are assigned, such as a print key, a copy key, numeric keys, a stop key, a start key, a power (on/off) switch. In the case of this embodiment, the hardware keys 401 are operation elements, provided with a backlight, such that, for example, light emitting diodes (LEDs) 402 for light emission are disposed on the back side of transparent keys or buttons. That is, in order to individually cause the hardware keys 401 to emit light, the LED 402 for light emission is provided on each of the hardware keys 401. Incidentally, when the operator can discriminate the respective hardware keys 401 at a glance, in place of the LEDs 402, a light emitting element such as a lamp may also be provided in the neighborhood of each of the hardware keys 401.

To the above-described hardware keys 401, various functions executed depending on operations by the operator may also be assigned in advance. As an example, to the print key, an input function of various data relating to normal printing is assigned. To the copy key, an input function of various data relating to copying (printing) in the case where (in an operation in a copying mode in which) the image forming apparatus 50 is used as a copying machine is assigned. Specifically, in the case where the print key or the copy key is operated, as the input function of various data, for example, a function of displaying an input screen for permitting input of various data on the display portion 410 is executed. To the numeric keys, for example, an input function permitting input of numeric values such as the number of sheets subjected to printing is assigned. To the stop key, for example, a function of forcedly stopping an image forming job during execution is assigned. To the start key, a function of providing an instruction to start execution of the image forming job including a reading operation of an original image during an operation in a copying mode is assigned. To the power switch, a function of turning on and off a power source of the image forming apparatus 50 is assigned.

<Display Portion>

The display portion 410 is capable of appropriately displaying various data inputted depending on the operation of the hardware keys 401, various pieces of information such as an operation status of the apparatus, and various screens such as an input screen to which the various data are inputted, for example. In the case of this embodiment, the display portion 410 is capable of displaying the software keys 403 as phantom (virtual) operation elements imitating the hardware keys 401. In FIG. 2, as an example, a copy button ("COPY"), a scan button ("SCAN") for starting reading of an original, a button for facsimile transmission ("FAX"), a setting button ("SET") for displaying a setting screen relating to a function other than these functions, and the like button are shown. In the case where the software keys 401 are displayed, depending a touch operation of the software keys 403 on the display portion 410 by the operator, various functions assigned to the software keys 403 are executed. That is, the display portion 410 is a display of a touch panel type capable of touch operation by the operator.

As specifically described later, in the case of this embodiment, the operator is capable of operating the hardware keys 401, similarly as in the case where the operator actually touches and operates the hardware keys 401, by directing an operator's line of sight to the hardware keys 401 without actually touching and operating the hardware keys 401 (so-called line-of-sight input). Further, in the case where the software keys 403 are displayed on the display portion 410, the operator is capable of performing the operation, similarly as in the case of the touch operation, by directing the operator's line of sight to the software key 403 intended to be operated, without performing the touch operation of the software key 403, i.e., is capable of performing the line-of-sight input. For that purpose, in the image forming apparatus 50 of this embodiment, a line-of-sight detecting device 500 used for detecting the operator's line of sight is provided on the panel cover 710 which is a part of the operation panel 70. By providing the line-of-sight detecting device 500 on the operation panel 700, the operator's line of sight is capable of being adjusted to a properly detectable position correspondingly to angle adjustment of the operation panel 700.

<Line-of-Sight Detecting Device>

As shown in FIG. 2, the line-of-sight detecting device 500 includes a camera 510 and a near infrared light source 520. The camera 510 as an image pickup portion is, for example, an autofocus (AF) digital camera capable of picking up an image by infrared radiation and includes an image pickup element such as a CMOS sensor or a CCD sensor. The near infrared light source 520 as an irradiation portion is, for example, a lighting device capable of irradiating an object with near infrared radiation of invisible (black) light and includes a plurality of light emitting elements such as near infrared LEDs. The near infrared light source 520 is disposed so that the operator operating the operation panel 700 in front of the image forming apparatus 50 can be irradiated with near infrared radiation, and the camera 510 is disposed so as to pick up an image of an operation panel's face (specifically an operator's eye) irradiated with the near infrared radiation emitted from the near infrared light source 520.

Further, the operation panel 700 is provided with a display lamp 420, a camera position display portion 421, a speaker 430 and a vibration generating device 440. The camera position display portion 421 is, for example, an LED or the like of a single color (for example, red) provided at a predetermined position in order to cause the operator to look at the camera 510 by being turned on during image pickup (shooting) by the camera 510. The display lamp 420 is, for example, LEDs or the like of a plurality colors for notifying the operator of an operation status of the apparatus with light. The display lamp 420 is turned on in green when the apparatus (device) is in a usable state, and is turned on in red when the apparatus is in an unusable state due to paper jam or out-of-order. The speaker 430 is a sound generating portion capable of generating, for example, operation guidance by sound or a warning sound. When the display lamp 420 and the speaker 430 are provided on the operation panel 700 which is positionally adjustable, notification to the operator may preferably be carried out properly visually or by sound. Further the operation panel 700 is provided with the vibration generating device 440, so that the vibration generating device 440 is capable of individually vibrating the hardware keys 401.

<Line-of-Sight Detection>

Figure 3:
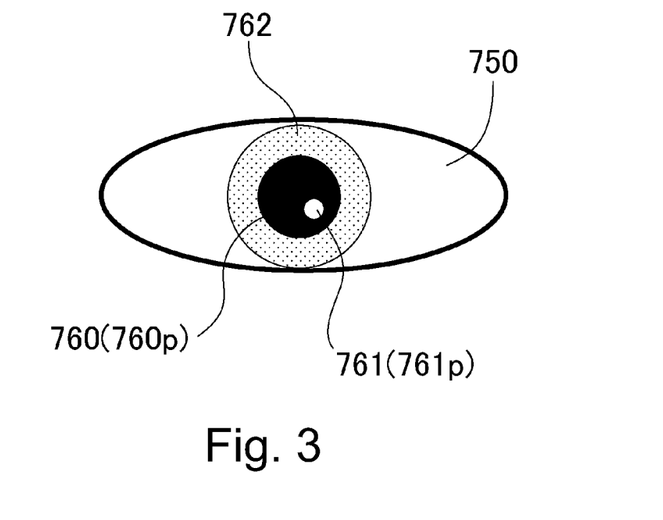
FIG. 3 is a schematic view showing an image of an operator's eye picked up by a camera.
Figure 4:
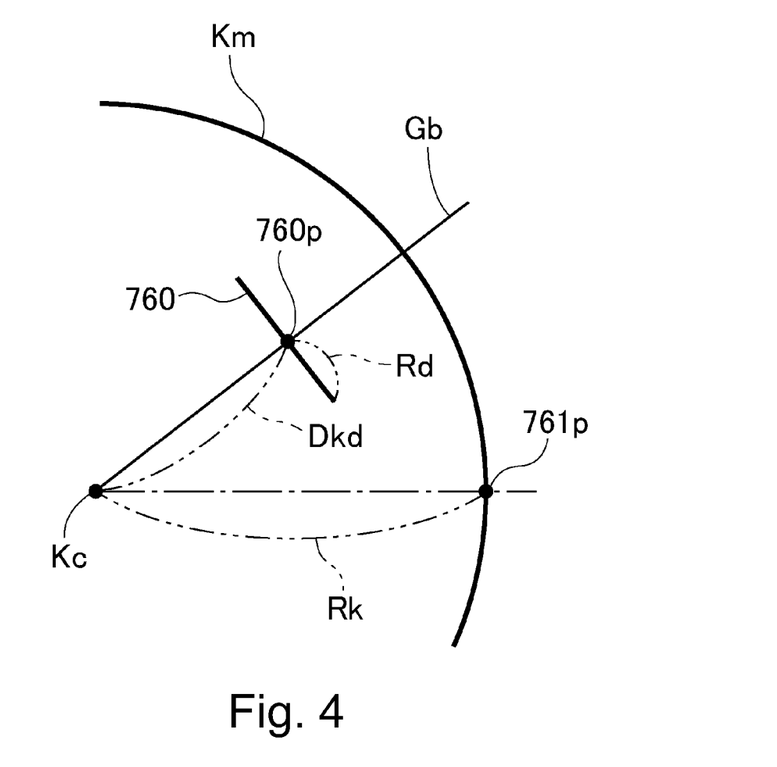
FIG. 4 is a schematic view shown an eyeball for illustrating operator's line-of-sight detection.

Operator's line-of-sight detection using the above-described line-of-sight detecting device 500 will be briefly described using FIGS. 3 and 4. In order to enable the operator's line-of-sight detection using the line-of-sight detecting device 500, there is a need to analyze operator's data (specifically data of the operator's eye) photographed by the camera 510. Therefore, in order to analyze this data, a controller 300 (specifically a line-of-sight detecting portion 300, FIG. 5) described later is provided. That is, in this embodiment, a line-of-sight detection portion capable of detecting the operator's line of sight is constituted by the line-of-sight detecting device 500 and the controller 300 (specifically the line-of-sight detecting portion 330).

For line-of-sight detection, a generally known line-of-sight detecting method may be employed, and in this embodiment, a cornea reflection method was employed. The corona reflection method is a method in which a reflection point center 761$p$ of a reflection point (Purkinje image) of reflected light a surface of corona Km of the operator's eye irradiated with the near infrared light and a pupil center 760$p$ of a pupil 760 of an eyeball 750 are specified and thus the operator's line of sight is detected. That is, a position of the pupil center 760$p$ is captured using a position of the reflection point center 761$p$ as a reference point, whereby a direction of the operator's line of sight is capable of being detected. A method of capturing the position of the pupil center 760$p$ includes two methods consisting of a bright pupil method and a dark pupil method. The bright pupil method is such that the pupil is brightened and the position is captured, and the dark pupil method is such that the pupil is darkened and the position is captured. In this embodiment, the dark pupil method was employed.

For specification of the position of the reflection point center 761$p$ and the pupil center 760$i$, first, data photographed by the camera 510 is divided pixel by pixel into the pupil 760, the iris 762 and the reflection point 761 of the operator's eye irradiated with the near infrared light, and brightness at each of pixels is compared with each other. The brightness at each of the pixels is detected in the order of (pupil)<(iris)<(reflection point). In accordance with this detection result, depending on a difference in brightness among the pupil 760, the iris 762 and the reflection point 761, black-and-white binarization of an image in which each of boundaries is captured is carried out, and centers of the pupil 760 and the reflection point 761 are acquired from contours of the pupil 760 and the reflection point 761, so that positions of the pupil center 760$p$ and the reflection point center 761$p$ are specified.

When the positions of the reflection point center 761$p$ and the pupil center 760$p$ are specified, a line-of-sight vector Gb is acquired on the basis of these positions. The line-of-sight vector Gb is acquired on the basis of a cornea radius of curvature Rk, a pupil radius Rd, and a distance Dkd from a cornea center of curvature Kc to the pupil center 760$p$ which are based on eyeball information registered in advance (FIG. 4). The corona center of curvature Kc and the pupil center 760$p$ are acquired from the two points consisting of the pupil center 760$p$ and the reflection point center 761$p$, the cornea radius of curvature Rk, the pupil radius Rd, and the distance Dkd from the cornea center of curvature Kc to the pupil center 760$p$. When the cornea center of curvature Kc and the pupil center 760$p$ are acquired, the line-of-sight vector Gb connecting these centers can be acquired. By acquiring the line-of-sight vector Gb, thereafter, motion of the pupil 760 can be captured through the camera 510, so that the operator's line of sight becomes detectable. Here, the line of sight refers to a direction at which the operator looks, and a pint on which the operator's line of sight is focused is an operator's eye point. In this embodiment, by detecting this operator's, a region on the operation panel 700 at which the operator looks is detected. That is, in this embodiment, the operator's eye point is detected by detecting the operator's line of sight. Thus, by detecting the operator's eye point, it is possible to detect that the operator looks at a specific region of regions on the operation panel 700. Incidentally, in the case of this embodiment, as regards the cornea radius of curvature Rk, the pupil radius Rd and the distance Dkd, general average values may be used.

Incidentally, after the positions of the pupil center 760$p$ and the reflection point center 761$p$ are specified, LSC (which is called calibration or the like) may preferably be performed. The line-of-sight correction is performed for carrying out the operator's line-of-sight detection with a smaller error.

<Controller>

As shown in FIG. 1, the image forming apparatus 50 of this embodiment includes the controller 300. The controller 300 will be described using FIG. 5 while making reference to FIGS. 1 and 2. Incidentally, to the controller 300, in addition to parts shown in FIG. 5, for example, the above-described image forming units 1$a$ to 1$d$, motors for driving various rollers, voltage sources for applying the primary transfer bias and the secondary transfer bias, and various devices such as the fixing device 40 are connected and are controlled by the controller 300. However, these parts are not principal objects of the present invention, and therefore will be omitted from illustration and description.

Figure 5:
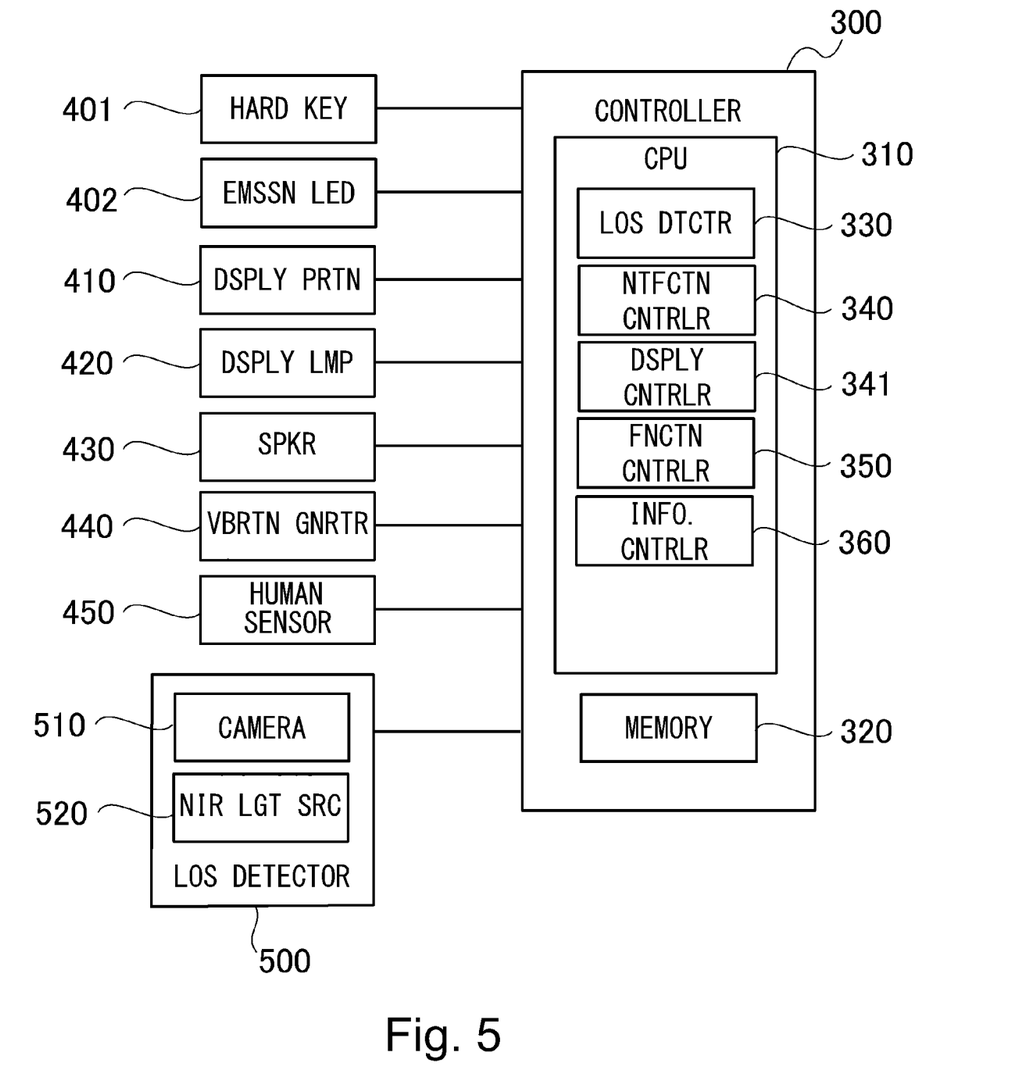
FIG. 5 is a control block diagram for illustrating a controller.

As shown in FIG. 5, the controller 300 includes a CPU (central processing unit) 310 and a memory 320 such as a ROM (read only memory) or a RAM (random access memory). In the memory 320 as a storing portion, for example, various programs such as a line-of-sight input program (FIGS. 6 and 7 described later) and an image forming job, and various data such as line-of-sight profile information described later and image data for software key display are capable of being stored. The CPU 10 is capable of executing the various programs stored in the memory 320. Incidentally, in the memory 310, a processing (calculation) result with execution of the various programs can also be temporarily stored.

In the case of this embodiment, by executing the line-of-sight input program, the CPU 310 is capable of controlling various operations of the image forming apparatus 50 relating to the operator's line-of-sight input. Incidentally, the line-of-sight input program is not limited to the form of a software program but may also be executable in the form of a microprogram processed by a DSP (digital signal processor), for example. That is, the CPU 310 may be used in combination with one for carrying out various pieces of control such as an image forming operation by executing a control program such as the image forming job, but is not limited thereto, and one prepared for exclusively executing a line-of-sight input program may also be used.

To this CPU 310, for example, the hardware keys 401, the LED 402 for light emission, the display portion 410, the display lamp 420, the speaker 430, the vibration generating device 440, the human sensor 450 and the line-of-sight detecting device 500 are connected via data busses and address busses. The CPU 310 acquires various data inputted by an operation of the hardware keys 401 and a touch operation of the display portion 410, for example.

In the case of this embodiment, when the location (position) of the operator by the above-described human sensor 450 is detected, the CPU 310 reads the line-of-sight input program (FIGS. 6 and 7) from the memory 320 and executes the line-of-sight input program. During execution of the line-of-sight input program, the CPU 310 is capable of functioning as the line-of-sight detecting portion 330, a notification controller 340, a display controller 341, a function executing portion 350, an information preparing portion 360 and the like.

The line-of-sight detecting portion 330 acquires data, photographed by the camera 510, from the line-of-sight detecting device 500 and analyzes the acquired data. As a result, operator's line-of-sight detection using the line-of-sight detecting device 500 can be performed. Further, the line-of-sight detecting portion 330 is capable of executing the line-of-sight correction. As a result, it becomes possible to perform accurate line-of-sight detection. Thus, in this embodiment, by the line-of-sight detecting portion 330, the operator's line-of-sight detection using the line-of-sight detecting device 500 can be realized. The notification controller 340 carries out control of notifying the operator of an event that the operator's line of sight was detected, by the display lamp 420, the speaker 430, the vibration generating device 440, the LED 402 for light emission, and the like which are used as a notifying portion. The display controller 341 is capable of controlling the display portion 410 as a notifying portion. The display controller 341 causes the display portion 410 to display the above-described software key 403, the status and the various screens. In the case of this embodiment, the display controller 341 is capable of notifying the operator of, as a status, that the operator's line of sight was detected or is capable of providing notification by changing display of the software key 403, on which the operator's line of sight is focused, on the basis of the detected operator's line of sight.

The function executing portion 350 executes various functions assigned to operation elements in advance, by an operation of the hardware key 401 or the software key 403 by the operator. The operations of the hardware key 401 and the software key 403 by the operator are not limited to a direct operation but may also be an indirect operation by the above-described line-of-sight input based on the operator's line-of-sight detection. The information preparing portion 360 as an information preparation portion prepares line-of-sight profile information which is information on a line of sight of each of operators (each of users) and causes the memory 320 to store the prepared line-of-sight profile information.

<Line-of-Sight Input Program>

Figure 6:
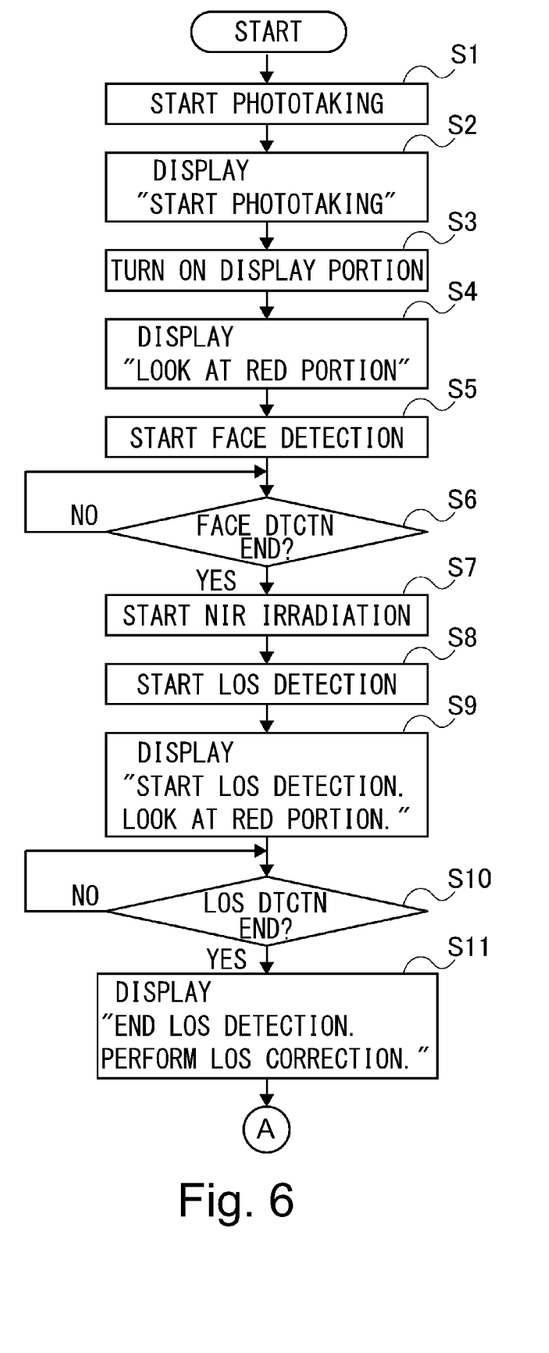
FIG. 6 is a flowchart showing the first half processing of line-of-sight input processing.
Figure 7:
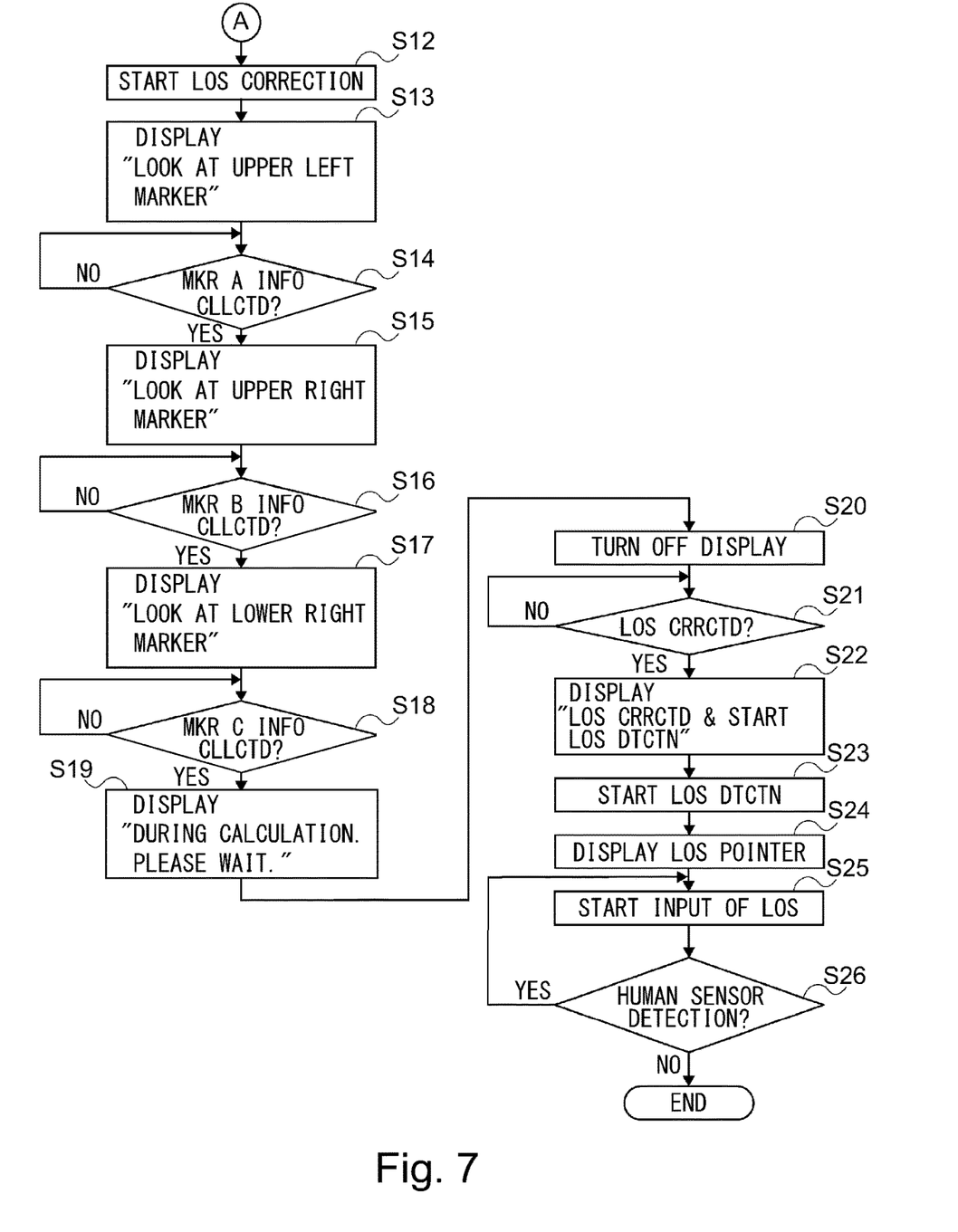
FIG. 7 is a flowchart showing the second half processing of the line-of-sight input processing subsequent to the first half processing.

Next, the line-of-sight input program of this embodiment will be described using FIGS. 6 and 7 while making reference to FIGS. 3 to 5. Line-of-sight input processing is started by the controller 300 when the operator's location (position) is detected by the human sensor 450 and is ended by the controller 300 in the case where the operator's location is not detected by the human sensor 450. Incidentally, in this embodiment, for convenience of illustration, the first half processing of the line-of-sight input processing is shown in FIG. 6, and the second half processing of the line-of-sight input processing is shown in FIG. 7.

In this embodiment, first, the line-of-sight detecting portion 330 for enabling the operator's line-of-sight detection is set by analyzing operator's data which is an image pickup result (output from the camera 510) of an image photographed by the camera 510, and then, on the basis of the image pickup (phototaking) result, an operation in a setting mode for detecting the operator's line of sight is executed. As shown in FIG. 6, the controller 300 starts operator's phototaking by the camera 510 (S1). In response to the start of the operator's phototaking, the controller 300 causes the display portion 410 to display "START PHOTOTAKING" (S2). Then, the controller 300 turns on a camera position display portion 420 (S3) and causes the display portion 410 to display "LOOK AT RED PORTION (ON PANEL)" as a status (S4). By this, the operator is caused to look at the camera 510, so that the camera 510 is capable of properly performing phototaking of an operator's face. Then, the controller 300 starts face detection on the basis of data acquired by the phototaking with the camera 510 (S5). The controller 300 causes the line-of-sight detecting device until the face detection is completed (NO of S6), and the processing goes to a process a subsequent step S7 by completion (end) of the face detection (YES of S6). In the face detection, in order to properly perform the operator's line-of-sight detection, an eye position different for each of operators is specified. Incidentally, the operator performs positional adjustment of the operation panel 700 so that the face of the operator looks toward a front side (surface) of the operation panel 700, so that the camera 510 is capable of phototaking the operator's face at a position suitable for the face detection.

The above-described face detection may be performed using a known face recognition function employed in a general-purpose digital camera. That is, on data photographed and acquired by the camera 510, a band-pass filter with respect to a horizontal direction and a band-pass filter with respect to a vertical direction are caused to act, so that an edge component is detected from the data. Then, by pattern matching of a face pattern based on the detected edge component with various face patterns stored in the memory 320 in advance, a candidacy group such as an eye, a nose and a mouth is extracted, so that the data is recognized as the face.

When the face detection is ended, the controller 300 causes a near infrared light source 520 to start irradiation of the operator with near infrared radiation (S7), and thus starts line-of-sight detection using the above-described dark pupil method as the cornea reflection method (S8). At that time, the controller 300 continuously maintains the camera position display portion 421 in a turned-on state and causes the display portion 410 to display a status such that "START LOS (LINE-OF-SIGHT) DETECTION. LOOK AT RED PORTION (ON PANEL)." (S9). Thus, the operator is caused to look at the camera 510 in a light-irradiation state and then is photographed by the camera 510, so that an image (Purkinje image) of reflected light on a cornea surface by the near infrared radiation irradiated from the near infrared light source 520 is clearly reflected in an operator's eye.

Then, the controller 300 causes the line-of-sight detecting device to stand by until the line-of-sight detection is ended (NO of S10), and the processing goes to a subsequent step S11 by an end of the line-of-sight detection (YES of S10). In the case of this embodiment, the controller 300 notifies the operator of an event that the line-of-sight detection is ended and causes the display portion 410 to display a status such that "END LOS DETECTION. PERFORM LOS CORRECTION.) (S11).

Incidentally, in this embodiment, the operator is notified of an event that the operator's line-of-sight detection was enabled by displaying the above-described status on the display portion 41, but a notifying method to the operator is not limited thereto. For example, the display lamp 420 may also be used. In that case, the display lamp 420 may also be caused to "flicker" in the case where an operation in a setting mode is started and may also be caused to be "turned on" when the operation in the setting mode is ended and then an inputting operation by the operator's line of sight is enabled. Or, the operator may also be notified of an event that the inputting operation by the operator's line of sight is enabled, by a voice from the speaker 430 or by continuously or intermittently vibrating the vibration generating device 440 provided on the operation panel 700.

In this embodiment, after the line-of-sight detection is ended, subsequently, line-of-sight correction (calibration) is performed, so that an operation in an information acquiring mode for preparing the line-of-sight profile information is capable of being executed. That is, as shown in FIG. 7, the controller 300 starts the line-of-sight correction (calibration) after the end of the line-of-sight detection (S12). In this embodiment, as an example of the line-of-sight detection, a method of causing the operator to situationally look at a plurality of positions (points) was used. That is, the operator is successively induced to look at three or more positions of the operation panel 700, and in a state in which the operation panel's line of sight is stayed so as to look at each of the positions for a predetermined time or more, a positional relationship (FIG. 4) between the pupil center 760p and the reflection point center 761p at each of the positions is acquired. Then, on the basis of the positional relationship between the pupil center 760p and the reflection point center 761p and a positional relationship among respective positions of the operation panel 700, a line-of-sight detection result (S10) is corrected. The line-of-sight detection result acquired by making line-of-sight correction as described above is stored in the memory 320 as line-of-sight profile information for each of operators.

Figure 8:
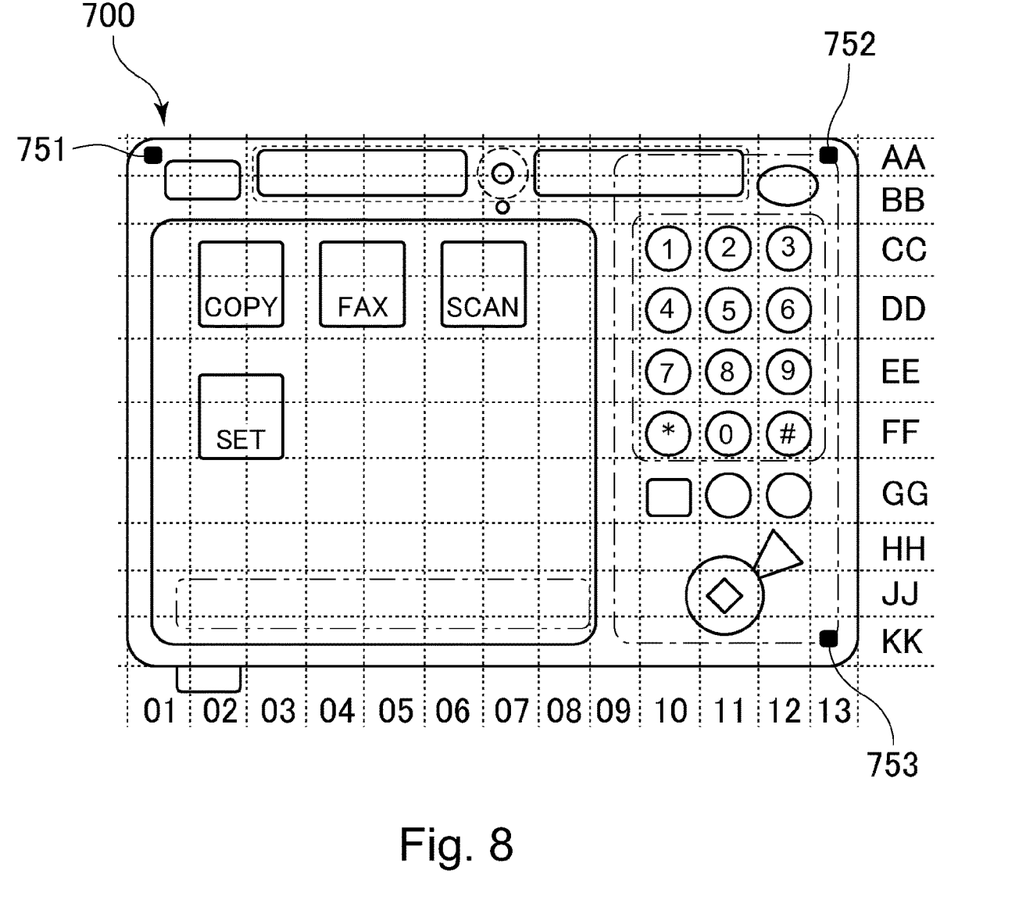
FIG. 8 is a schematic view for illustrating line-of-sight correction.

Here, a condition necessary to correct the line of sight will be described using FIG. 8 while making reference to FIG. 5. The operation panel 700 is provided with addresses divided in advance into portions in a mesh-like shape so that the line-of-sight detecting portion 330 can specify the respective positions of the operation panel 700. In this embodiment, a region of the display portion 700 is divided into 10 rows from "AA" to "KK" and 13 columns from "01" to "13", so that 130 addresses (=10 rows×13 columns) are provided. Each of these addresses is provided with absolute coordinates with respect to an X direction, a Y direction and a Z direction, as absolute coordinates of a three-dimensional space, and are stored, in the memory 320, as calculation base data by the line-of-sight detecting device 330.

Further, in three corners of four corners of the operation panel 700, three makers 751, 752 and 753 as target portions for permitting visual recognition by the operator for the line-of-sight correction. In this embodiment, the makers 751, 752 and 753 are provided in an upper left corner, an upper right corner and a lower right corner, respectively, of the operation panel 700. These makers 751 to 753 are disposed so that on a rectilinear line connecting any two makers, another maker is not positioned. Incidentally, the makers may only be required to be provided in at least two positions on the display portion 700. However, at least two of the makers may preferably be provided in the corners of the operation panel 700.

Each of the target portions is formed in a rectangular shape of 5 mm×5 mm so as to be visually recognized by the operator and may also be pointed a conspicuous color (for example, yellow, blue or the like which is different from a color of the panel cover 710) as in the case of the makers 751 to 753. Or, each of the target portions may also be formed with an LED or the like so as to be capable of emitting light. Further, each target portion may also be formed by sticking a seal member on the panel cover 710. Incidentally, a size of each target portion is not limited to the above-described size if the size is easily visually recognized by the operator and is a size such that the line-of-sight correction is enabled. To these makers 751 to 753 as the target portions, absolute coordinates with respect to the X direction, the Y direction and the Z direction as absolute coordinates of the three-dimensional space are assigned. For example, center position coordinates of the maker 751 (address AA01) are "X=AA01x, Y=AA01y, Z=AA01z". Center position coordinates of the maker 752 (address AA13) are "X=AA13x, Y=AA13y, Z=AA13z". Center position coordinates of the maker 753 (address KK13) are "X=KK13x, Y=KK13x, Z=KK13z". The center position coordinates of these makers 751 to 753.

Returning to FIG. 7, in order to notify the operator of an event that the line-of-sight correction is to be made, the controller 300 causes the display portion 410 to display a status such that "START LINE-OF-SIGHT (LOS) CORRECTION. LOOK AT UPPER LEFT MAKER (OF OPERATING PORTION)." (S13). Then, on the basis of data of the operator who stationarily looks at the maker 751 photographed by the camera 510, the controller 300 discriminates whether or not information acquisition necessary for the line-of-sight correction is completed by causing the operator to stationarily look at the maker 751 (S14). The controller 300 causes the operator to stationarily look at the maker 751 until the information acquisition necessary for the line-of-sight correction is completed, and causes the camera 510 to photograph the operator (NO of S14). By doing so, from data of the operator photographed by the camera 510, positions of two visual observation points and line-of-sight information when the operator stationarily looks at the maker 751 (maker A) are acquired. Specifically, a maker A reflection point center 761pA, a maker A pupil center 760pA, a maker A arithmetic cornea center of curvature KcAs, and a maker A arithmetic line-of-sight vector GsA are acquired.

In the case where the information acquisition necessary for the line-of-sight correction is completed by causing the operator to stationarily look at the maker 751 (YES of S14), the controller 300 similarly causes the operator to stationarily look at another maker 752 and causes the camera 510 to photograph the operator. For that purpose, the controller 300 causes the display portion 410 to display a status such that "DURING LOS CORRECTION. LOOK AT UPPER RIGHT MAKER (OF OPERATING PORTION)." (S15). On the basis of data of the operator who stationarily looks at the maker 752 (maker B), the controller 300 causes the operator to stationarily look at the maker 752 until the information acquisition necessary for the line-of-sight correction is completed by causing the operator to stationarily look at the maker 752, and causes the camera 510 to photograph the operator (NO of S16). By doing so, from data of the operator photographed by the camera 510, a maker B reflection point center 761pB, a maker B pupil center 760pB, a maker B arithmetic center of curvature KcBs, and a maker B arithmetic line-of-sight vector GsB are acquired.

Further, in the case where the information acquisition necessary for the line-of-sight correction is completed by causing the operator to stationarily look at the maker 752 (YES of S16), the controller 300 similarly causes the operator to stationarily look at another maker 753 and causes the camera 510 to photograph the operator. For that purpose, the controller 300 causes the display portion 410 to display a status such that "DURING LOS CORRECTION. LOOK AT LOWER RIGHT MAKER (OF OPERATING PORTION)." (S17). On the basis of data of the operator who stationarily looks at the maker 753 (maker C), the controller 300 causes the operator to stationarily look at the maker 753 until the information acquisition necessary for the line-of-sight correction is completed by causing the operator to stationarily look at the maker 753, and causes the camera 510 to photograph the operator (NO of S18). By doing so, from data of the operator photographed by the camera 510, a maker C reflection point center 761pC, a maker C pupil center 760pC, a maker C arithmetic center of curvature KcCs, and a maker C arithmetic line-of-sight vector GsC are acquired. The controller 300 not only calculates a line-of-sight correction value on the basis of the thus acquired information necessary for the line-of-sight correction but also causes the display portion 410 to display a status such that "DURING CALCULATION OF LOS CORRECTION VALUE. PLEASE WAIT." (S19). Further, the controller 300 turns of the camera position display portion 421 (S20). The controller 300 interrupts progress of the processing until calculation of the line-of-sight profile information (calculation of the line-of-sight correction value) for each of operators by the information preparing portion 360, in other words, until proper line-of-sight detection of the associated operator is enabled (NO of S21). When the calculation of the line-of-sight correction value is completed, the controller 300 (specifically the line-of-sight detecting portion 330) is capable of causing the line-of-sight vector (FIG. 4) and the address (FIG. 8) on the operation panel 700 to be substantially coincide with each other. Incidentally, in the above description, display prompting the operator to look at the respective makers 751 to 753 is made successively for each of the makers 751 to 753, but the present invention is not limited thereto. For example, in the case where in place of the makers 751 to 753. LEDs are provided as the target portions, display such that "SUCCESSIVELY LOOK AT LEDs TO BE TURNED ON" may also be made.

As regards the calculation of the line-of-sight correction value, a line-of-sight correction value of the maker 751 with respect to a YZ direction will be described as an example. In the calculation of the line-of-sight correction value, the center position coordinates "X=AA01x, Y=AA01y, Z=AA01z" of the maker 751, the maker A reflection point center 761pA, the maker A pupil center 760pA, the maker A arithmetic center of curvature KcAs and the maker A arithmetic line-of-sight vector GsA are used. The maker A pupil center of curvature KcA is acquired from the Y coordinates "AA01y" and the Z coordinate "AA01z" of the maker 751 of the operation panel 700. A coordination deviation between the maker A pupil center of curvature KcA and the maker A arithmetic pupil center of curvature KcAs is an error between a value of individual operator and an average using an arithmetic expression. This error is used as a correction value in a line-of-sight measurement calculation expression (not shown) of the line-of-sight detecting portion 300. This correction value is also used in arithmetic calculation with respect to an XZ direction, and line-of-sight information acquired by causing the operator to stationarily look at the makers 752 and 753 is similarly subjected to the above-described arithmetic calculation, so that high line-of-sight detection accuracy can be achieved.

Returning to FIG. 7, the controller 300 prepares the line-of-sight profile information for each of operators on the basis of the operator's line of sight detected for each of the positions where the makers 751 to 753 are provided, by execution of the operation in the information acquiring mode as described above. Then, when proper line-of-sight detection is enabled on the basis of the prepared line-of-sight profile information (YES Of S21), the processing by the controller 300 goes to an operation in the line-of-sight input(ting) mode in which various functions are executed by the operator's line of sight. The line-of-sight input mode is a mode such that input relating to the image formation is received in accordance with a line-of-sight input operation by the user's (operator's) line of sight detected in the operation in the setting mode. With the change from the setting mode to the line-of-sight input mode, the controller 300 causes the display portion 410 to display, as a status, that "COMPLETE LOS CORRECTION & START LOS DETECTION" (S22), so that detection of the operator's line of sight is started (S23). Thus, in this embodiment, in the operation in the setting mode, the user's line of sight is set in a detectable state, and the operator is notified of an event that the line-of-sight input operation by the user's line of sight detected on the basis of the setting of the setting mode in the line-of-sight input mode is enabled. In other words, the user is notified of an event that setting of the user's line of sight into the detectable state is completed in the operation in the setting mode, or the user is notified of an event that the mode is changed from the setting mode to the line-of-sight input mode. At this time, the controller 300 (specifically the display controller 341) causes the display portion 410 to display a line-of-sight pointer 810 (FIG. 2) as a mark indicating the operator's line of sight for notifying the operator of a position on the display portion 410 to which the operator's line of sight is directed, in synchronism with the start of the line-of-sight detection (S24). Incidentally, the controller 300 is capable of notifying the user of an event that the mode is changed from the setting mode to the line-of-sight input mode, also by causing the display portion 410 to display the line-of-sight pointer 810. Then, the controller 300 starts the input of the line of sight (S25). That is, the line-of-sight pointer 810 displayed on the display portion 410 is displayed so as to move on the display portion 410 in synchronism with movement of the operator's line of sight, and therefore, the operator is capable of recognizing that the operator's line of sight himself (herself) is directed to which position, by the line-of-sight pointer 810. Further, the operator is capable of executing operations, i.e., various functions by directing the operator's line of sight to the hardware key 401 of the hardware portion or by matching the line-of-sight pointer 810 with the software key 403, displayed on the display portion 410, by the operator's line of sight (line-of-sight input).

When the line-of-sight detection is enabled, the line-of-sight detecting portion 330 continuously performs position calculation on the basis of the data of the operator photographed by the camera 510. As a result, the line-of-sight pointer 810 displayed on the display portion 410 is displayed by the display controller 341 so as to move on the display portion 410 in synchronism with movement of the operator's line of sight. Then, when the operator's line of sight deviates from the display portion 410 and moves to the hardware portion 400, the display controller 341 places the line-of-sight pointer 810 in a non-display state. Further, when the operator's line of sight is directed to any one of the hardware keys 401 of the hardware portion 400, the display controller 341 causes the display portion 410 to display information (for example, name, function and the like) on the hardware key 401 to which the operator's line of sight is directed. Specification (identification) of the destination of the operator's line of sight by the display controller 341 is carried out by whether or not a coordinate of each of regions on the operation panel 700 to which the addresses from "AA01" to "KK13" are assigned (FIG. 8), and a coordinate of the operator's line of sight to be specified by the line-of-sight detecting portion 330 are substantially coincide with each other. For example, an address of a low-power mode button of the hardware portion 400 is "BB12", and therefore, in the case where the coordinate of the operator's line of sight coincides with the coordinate of the address "BB12", display such that "OUT LOOKS AT LOW-POWER MODE BUTTON" is made as a status on the display portion 410.

Then, the controller 300 discriminates whether or not a state in which the location (position) of the operator is detected by the human sensor 450 is formed (S26), and so long as the human sensor 450 is in the state of detecting the operator's location (YES of S26), the processing is returned to the process of S25 and the line-of-sight input is continued. On the other hand, in the case where the state is changed from the state in which the operator's location is detected to a state in which the operator's location is not detected (NO of S26), the controller 300 ends the line-of-sight input processing. Incidentally, as described above, in the case where very high accuracy is not required in the operator's line-of-sight detection, the line-of-sight correction may also be not performed. In this case, when the line-of-sight detection is completed in S10 of FIG. 6, in S11, display such that "LOS DETECTION ENDS. INPUT OPERATION BY LOS IS POSSIBLE." is made on the display portion. That is, in the case where the line-of-sight correction is not made, in S10, the setting mode is ended. Then, after the process of S11 of FIG. 6 is executed, processes of S23 and later of FIG. 27 are executed. That is, in the case where the line-of-sight correction is not made, the input operation by the operator's line of sight is enabled on the basis of the operator's line of sight detected in S10. Further, as regards whether or not the line-of-sight correction is executed, a constitution in which setting is made by the operator may also be employed.

<Example of Line-of-Sight Input Operation>

Figure 9:
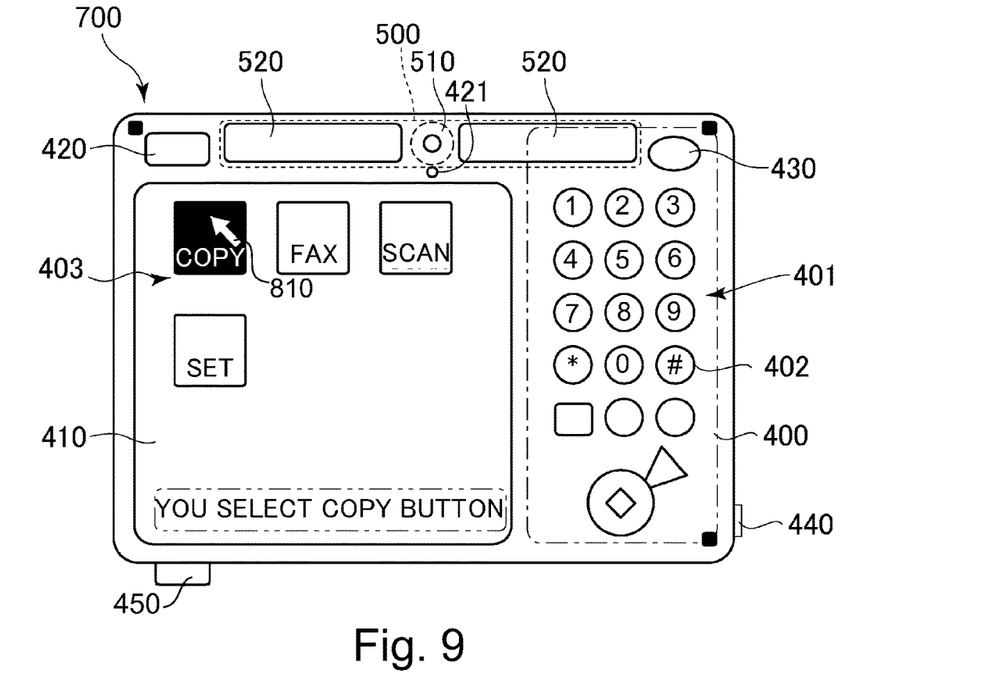
FIG. 9 is a schematic view for illustrating a line-of-sight input operation.
Figure 10:
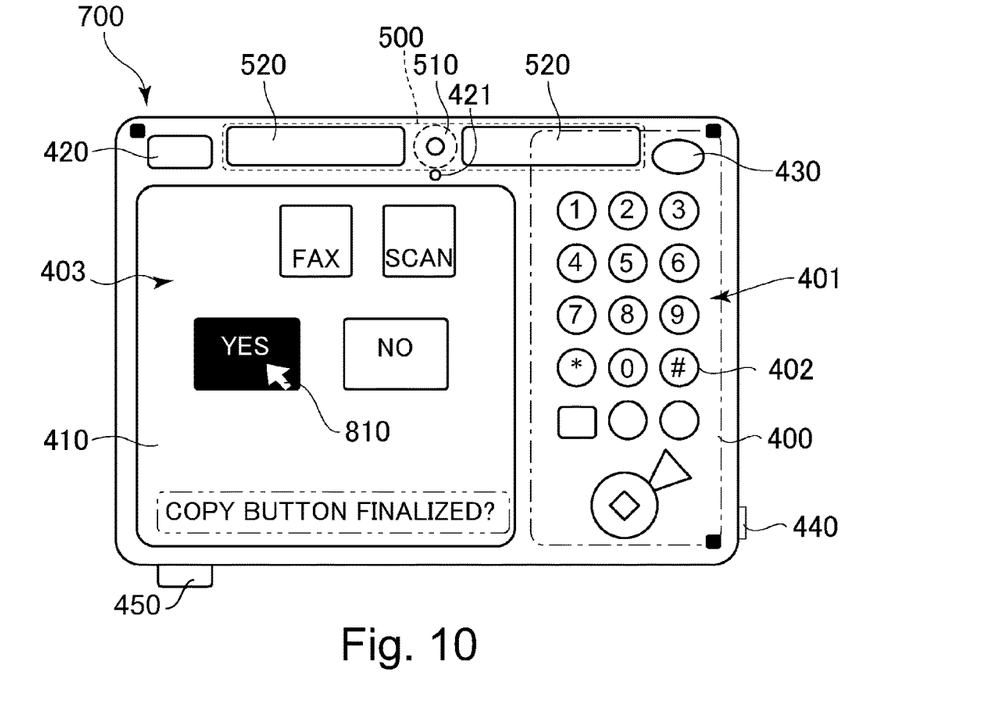
FIG. 10 is a schematic view showing an example of the line-of-sight input operation.

The above-described line-of-sight input operation will be specifically described using FIGS. 9 and 10. In FIG. 9, the case where the operator operates a "copy button (COPY)" which is the software key 403 displayed on the display portion 410, by the operator's line of sight will be described as an example. The operator is capable of moving his (her) line of sight onto the copy button by looking at the line-of-sight pointer 810 displayed on the display portion 410. An address of the copy button is "CC02, CC03, DD02, DD03" (FIG. 8). The operator continues a state in which the line-of-sight pointer 810 is positioned in a region of these four positions for a first time or more (for example, two seconds or more), so that the line-of-sight detecting portion 330 is capable of determining that the operator looks at the copy button. When the position of the operator's line of sight is determined by the line-of-sight detecting portion 330, the display controller 341 causes the display portion 410 to display, as a status, such that "YOU SELECTS COPY BUTTON" as shown in FIG. 9. Further, the display controller 341 changes a display color of the software key (the copy button in this case) overlapping with the line-of-sight pointer 810 to a color different from other software keys which do not overlap with the line-of-sight pointer 810. As a result, the operator is capable of checking whether or not the position of his (her) line of sight and the position of the operator's line of sight detected by the image forming apparatus coincide with each other.

Thereafter, when the state in which the line-of-sight pointer 810 is positioned in the region of the above-described four positions is further continued for a second time (for example, 1 second or more), the display controller 341 switches the display of the display portion 410. For example, as shown in FIG. 10, the display controller 341 causes the display portion 410 to display a selection screen including a "YES" button and a "NO" button as software keys 403 in place of the "copy button". At the same time, the status of the display portion 410 is switched from "YOU SELECT COPY BUTTON" to "DO YOU FINALIZE SETTING TO COPY BUTTON?". Then, in the case where the operator directs his (her) line of sight to the "YES" button, the function executing portion 350 causes the image forming apparatus to operate so as to execute a copy function assigned to the "copy button". On the other hand, in the case where the operator directs his (her) line of sight to the "NO" button, the display controller 341 carries out control in which the screen displayed is returned from the above-described selection screen to the screen (FIG. 9) before the "copy button" is selected. Incidentally, the first image and the second time may also be the same time (for example, 1 second or more and so on) if the time is a time in which a state that the line-of-sight pointer 810 is positioned within a predetermined region for a predetermined time can be discriminated.

Incidentally, in this embodiment, for example, in the case where the operator does not understand an operating method, the operator may also perform an operation, other than the image forming operation, such that the operator calls up a manual or contacts a support center by operating a "help" button, displayed on the display portion 410, by the line-of-sight input.

Further, in the above-described embodiment, when the hardware key 401 or the software key 403 is selected by the operator's line of sight, the controller causes the display portion 410 to display the information on the hardware key 401 or the software key 403 which is selected, and thus the operator is notified of the information, but the present invention is not limited thereto. For example, it is only required to notify the operator of the hardware key 401 or the software key 403 to which the operator's line of sight is directed, by flickering the hardware key 401 or by changing the display color or size of the software key 403, i.e., to notify the operator of the hardware key 401 or the software key 403 which is to be operated by the line-of-sight input. Further, the hardware key 401 or the software key 403 may also be notified to the operator by a sound (voice guidance) using the speaker 430 or by vibration using the vibration generating device 440.

Incidentally, the prepared line-of-sight profile information for each operator may preferably be stored in the memory 320 in advance (FIG. 5) so that the line-of-sight profile information can be used by being called up when the image forming apparatus 50 is used again. By doing so, when the same operator uses the image forming apparatus 50 again, execution of the operation in the information acquiring mode (S12 to S21 of FIG. 7) can be omitted. For example, the associated line-of-sight profile information can also be read from the memory 320 by providing an authentication device 800 (FIG. 1) as a specifying (identifying) portion to the image forming apparatus 50 and then by performing authentication with an ID card in which personal information is written (stored). That is, in the case where the operator specified by the authentication device 800 is the operator of which line-of-sight profile information is stored in the memory 320, as the operation in the above-described information acquiring mode, it is only required that corresponding line-of-sight profile information is read from the memory 320. In other words, in the case where the operator specified by the authentication device 800 is not the operator of which line-of-sight profile information is stored in the memory 320, the operation in the above-described information acquiring mode is executed, so that line-of-sight profile information is prepared and stored in the memory 320.

As described above, in this embodiment, the operator was notified, by the display, the voice, the vibration or the like, of an event that the operator's line-of-sight detection using the line-of-sight detecting device 500 was enabled. The operator can know that the line-of-sight detection is possible, by the notification, and can immediately perform the operation by the line-of-sight input, so that usability is improved. On the other hand, as in the conventional constitution, in the case where the operator is not notified of an event that the line-of-sight detection is possible, the operator cannot know whether or not the operation by the line-of-sight input is possible, and thus takes time to perform the operation by the line-of-sight input. Particularly, an operator who first performs the line-of-sight input is required to perform line-of-sight detection as a preparatory operation for the line-of-sight input, so that when the operator is not notified of an event that the line-of-sight input is possible, it is difficult for the operator to smoothly perform the line-of-sight input. In this embodiment, the operator is notified of an event that the line-of-sight input is possible, and the operator is capable of smoothly make a change from line-of-sight detection as the preparatory operation to line-of-sight detection for the line-of-sight input, so that usability is improved. Thus, a constitution which employs the line-of-sight detection technique in the image forming apparatus 50 and which is better in ease-of-use, i.e., which is higher in usability can be realized.

Incidentally, in the above-described embodiment, a constitution in which the hardware portion 400 and the display portion 410 are provided on the display portion 700 was described as an example, but the present invention is not limited thereto. For example, the operation panel 700 may also be one including only the hardware portion or one including a whole-surface liquid crystal panel consisting only of the display portion 410. That is, only the hardware key 401 or only the software key 403 displayed on the display portion 410 may also be operable by the operator's line of sight. Further, in the above-described embodiment, a constitution in which the operation panel 700 is provided with the line-of-sight detecting device 500 was employed, but the present invention is not limited thereto. For example, the line-of-sight detecting device 500 may also be provided on the apparatus main assembly 50a or on the original reading device 601 or the like if a position thereof is in the neighborhood of the operation panel 700 and permits detection of the operator's line of sight directed to the operation panel 700.

According to the present invention, in the image forming apparatus employing the line-of-sight detection technique, convenience of the user (operator) can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-007929 filed on Jan. 21, 2019, 2019-007930 filed on Jan. 21, 2019, 2019-007931 filed on Jan. 21, 2019, and 2019-007932 filed on Jan. 21, 2019 which are hereby incorporated by reference herein in their entirety.

What is claimed is:

1. An image forming apparatus, comprising:
   an image forming unit configured to form an image on a recording material;
   a display portion capable of displaying a software key permitting input by a user's line of sight;
   an image pickup portion configured to pick up an image of a user's face;
   a target portion provided at two or more positions of an operation unit; and
   a controller capable of executing an operation in a setting mode in which setting is made on the basis of a pickup result obtained by the image of the user's face picked up by said image pickup portion such that the user's line of sight is in a detectable state and an operation in an input mode in which input corresponding to the software key is received in accordance with a line-of-sight input operation to the software key by the user's line of sight detected on the basis of the setting of the setting mode,
   wherein the setting mode includes an information acquiring mode in which information on the user's line of sight to which reference is made when the user's line of sight is detected is acquired and a correction mode in which a result of the user's line of sight detected by said image pickup portion is corrected on the basis of the information on the line of sight for each of users acquired by the execution of the operation in the information acquiring mode,
   wherein said controller is capable of executing an operation in the input mode in which input corresponding to the software key is received in accordance with a line of sight input operation to the software key by the user's line of sight detected on the basis of the correcting of the correcting mode,
   wherein in the input mode said controller is capable of executing an image forming job in which said controller causes said image forming unit to form the image on the recording material on the basis of the line-of-sight input operation, and
   wherein said controller notifies a user of an event that an operation mode is changed from the setting mode to the input mode.

2. An image forming apparatus according to claim 1, wherein said software key permits a touch operation by the user.

3. An image forming apparatus according to claim 1, further comprising an operating unit including said display portion and a panel cover provided so as to expose said display portion,
   wherein said image pickup portion is provided on said panel cover.

4. An image forming apparatus according to claim 1, wherein said controller causes said display portion to display a display screen for notifying the user of an event that the operation mode is changed from the setting mode to the input mode.

5. An image forming apparatus according to claim 4 wherein when the operation mode is changed from the setting mode to the input mode, said controller causes said display portion to display a mark movable in interrelation with movement of the user's line of sight detected on the basis of the setting mode.

6. An image forming apparatus according to claim 1, further comprising a light emitting portion configured to emit light,
wherein said controller causes said light emitting portion to emit light when the operation mode is changed from the setting mode to the input mode.

7. An image forming apparatus according to claim 1, further comprising a sound generating portion configured to generate a notification sound to the user,
wherein said controller causes said sound generating portion to generate the notification sound.

8. An image forming apparatus, comprising:
an image forming unit configured to form an image on a recording material;
a display portion capable of displaying information on said image forming apparatus;
an image pickup portion configured to pick up an image of a user's face;
a target portion provided at two or more positions of an operation unit; and
a controller capable of executing an operation in an information acquiring mode in which information on the user's line of sight to which reference is made when the user's line of sight is detected is acquired, a correction mode in which a result of the user's line of sight detected by said image pickup portion is corrected on the basis of the information on the line of sight for each of users acquired by the execution of the operation in the information acquiring mode, and an input mode in which input corresponding to the software key is received in accordance with a line of sight input operation to the software key by the user's line of sight detected on the basis of a pickup result of said image pickup portion,
wherein said controller is capable of executing an operation in the input mode in which input corresponding to the software key is received in accordance with a line of sight input operation to the software key by the user's line of sight detected on the basis of the correcting of the correcting mode,
wherein in the input mode said controller is capable of executing an image forming job in which said controller causes said image forming unit to form the image on the recording material on the basis of the line-of-sight input operation, and
wherein said controller causes said display portion to display a mark movable in interrelation with movement of the detected user's line of sight.

9. An image forming apparatus according to claim 8, wherein said display portion is capable of displaying a plurality of software keys capable of being touch operable by a user, and
wherein said controller changes a color of the software key, of said software keys, overlapping with the mark to a color different from a color of said software keys non-overlapping with the mark.

10. An image forming apparatus according to claim 8, wherein when the detected user's line of sight is directed to a predetermined software key of said software keys over a predetermined time or more, said controller executes a function assigned to the predetermined software key.

11. An image forming apparatus, comprising:
an image forming unit configured to form an image on a recording material;
a display portion capable of displaying a plurality of software keys permitting input by a user's line of sight;
an image pickup portion configured to pick up an image of the user's line of sight;
a target portion provided at two or more positions of an operation unit; and
a controller capable of executing an operation in an information acquiring mode in which information on the user's line of sight to which reference is made when the user's line of sight is detected is acquired, a correction mode in which a result of the user's line of sight detected by said image pickup portion is corrected on the basis of the information on the line of sight for each of users acquired by the execution of the operation in the information acquiring mode, and an input mode in which input corresponding to the software key is received in accordance with a line of sight input operation to the software key by the user's line of sight detected on the basis of a pickup result of said image pickup portion,
wherein said controller is capable of executing an operation in the input mode in which input corresponding to the software key is received in accordance with a line of sight input operation to the software key by the user's line of sight detected on the basis of the correcting of the correcting mode,
wherein in the input mode said controller is capable of executing an image forming job in which said controller causes said image forming unit to form the image on the recording material on the basis of the line-of-sight input operation, and
wherein said controller notifies a user of an event that the user's line of sight is directed by any of said software keys.

12. An image forming apparatus according to claim 11, wherein when the user's line of sight is directed to any of said software keys for a predetermined time or more, said controller receives line-of-sight input to said software key to which the user's line of sight is directed.

13. An image forming apparatus according to claim 11, wherein when the user's line of sight is directed to a predetermined software key, said controller notifies a user of an event that the predetermined software key to which the user's line of sight is directed is which software key of said software keys by voice guidance.

14. An image forming apparatus according to claim 11, wherein when the user's line of sight is directed to a predetermined software key, said controller notifies a user of a color of the predetermined software key to which the user's line of sight is directed by changing a color of other software keys, to which the user's line of sight is not directed, to a different color.

15. An image forming apparatus comprising:
an image forming unit configured to form an image on a recording material;
an operation unit including a display portion capable of displaying a software key permitting input by a user's line of sight;

an image pickup portion configured to pick up an image of the user's line of sight;

a target portion provided at two or more positions of said operation unit; and a controller configured to detect the user's line of sight on the basis of output of said image pickup portion and configured to receive line-of-sight input to the software key by the user's line of sight, wherein on the basis of an image pick up result of said image pickup portion acquired when the user's line of sight is positioned at said target portion, said controller is capable of executing an operation in an information acquiring mode in which information on the user's line of sight to which reference is made when the user's line of sight is detected is acquired, wherein said controller is capable of an operation in a correction mode in which a result of the user's line of sight detected by said image pickup portion is corrected on the basis of the information on the line of sight for each of users acquired by the execution of the operation in the information acquiring mode, and wherein said controller is capable of executing an operation in an input mode in which input corresponding to the software key is received in accordance with a line of sight input operation to the software key by the user's line of sight detected on the basis of the correcting of the correcting mode.

16. An image forming apparatus according to claim 15, further comprising a storing portion in which information on a line of sight for each of users acquired by execution of the operation in the information acquiring mode.

17. An image forming apparatus according to claim 15, wherein in accordance with an operation of line-of-sight input to the software key on the basis of the detection result of the corrected user's line of sight, said controller is capable of executing an operation in an input mode in which input corresponding to the software key is carried out.

18. An image forming apparatus according to claim 15, wherein said target portion includes a first target portion, a second target portion and a third target portion, and wherein said third target portion is provided at a position different from a rectilinear line connecting said first target portion and said second target portion.

19. An image forming apparatus according to claim 18, wherein at least two of said first target portion, said second target portion and said third target portion are provided at corners of said operation unit.

20. An image forming apparatus according to claim 15, wherein said operation unit is provided with a substrate and a cover for covering said substrate so as to expose said display portion, and wherein said target portion is provided on said cover.

* * * * *